United States Patent [19]

Boyer et al.

[11] Patent Number: 5,797,136
[45] Date of Patent: Aug. 18, 1998

[54] OPTIONAL QUANTIFIERS IN RELATIONAL AND OBJECT-ORIENTED VIEWS OF DATABASE SYSTEMS

[75] Inventors: Philip L. Boyer; Gerald G. Kiernan, both of San Jose, Calif.

[73] Assignee: International Business Machines Corporation, Armonk, N.Y.

[21] Appl. No.: 539,561

[22] Filed: Oct. 5, 1995

[51] Int. Cl.$^6$ .................................................. G06F 17/30
[52] U.S. Cl. ........................................ 707/2; 707/3; 707/5
[58] Field of Search .................................. 395/602, 603, 395/605

[56] References Cited

U.S. PATENT DOCUMENTS

| | | | |
|---|---|---|---|
| 5,091,852 | 2/1992 | Tsuchida | 707/5 |
| 5,121,494 | 6/1992 | Dias et al. | 395/600 |
| 5,241,648 | 8/1993 | Cheng et al. | 395/600 |
| 5,367,675 | 11/1994 | Cheng et al. | 395/600 |
| 5,412,804 | 5/1995 | Krisha | 707/2 |
| 5,548,755 | 8/1996 | Leung | 707/2 |
| 5,555,367 | 9/1996 | Premerlani | 707/4 |
| 5,557,791 | 9/1996 | Cheng | 707/2 |

OTHER PUBLICATIONS

"Handling The Nulls Generated By Extending relational Operations", A. Larner, IBM Technical Disclosure Bulletin, vol. 34, No. 4A, Sep. 1991, pp. 331–339.

"Extensible Design For Generating Alternative Join Sequences In A Relational Query Optimizer", G. M. Lohman, K. Ono; IBM Technical Disclosure Bulletin, vol. 32, No. 11, Apr. 1990, pp. 317–318.

"Heuristic Method for Joining relational Data Base Tables", G. M. Lohman, IBM Technical Disclosure Bulletin, vol. 30, No. 9, Feb. 1988, pp. 8–10.

ISO–ANSI Working Draft: Database Language SQL2 and SQL3.

C. Date, Relational Database; Selected Writings, Addison–Wesley Publishing Co. 1986.

"Object–Oriented Database Systems: Promise, Reality, and Future," Kim, Won, *Proc. 19th International Conference on Very Large Data Bases,* Dublin, Aug. 1993.

"A data Model and Query Language for EXODUS," *Proc. ACM–SIGMOD International Conference on Management of Data,* Carey, Mike; DeWitt, David; Vandenburg, Scott; Chicago, Jun. 1988.

"A model of Queries for Object–Oriented Databases," Kim, Won. *Proc. 15th International Conference on Very Large Data Bases,* Amsterdam, Aug. 1989.

"A Query Language for the $O_2$ Object–Oriented Database System," Bancilhon, Francois; Cluet S.; Delobel, C.; *Proc. 2nd International Workshop on Database Programming Languages,* Hull, Richard; Morrison, Ron; Stemple, David, editors; Gleneden Beach, Jun. 1989, Morgan–Kaufmann Publishers, Inc.

(List continued on next page.)

*Primary Examiner*—Thomas G. Black
*Assistant Examiner*—Diane D. Mizrahi
*Attorney, Agent, or Firm*—Marilyn Smith Dawkins

[57] ABSTRACT

A system, method, and program enables database management systems for relational and object-oriented databases to recognize a quantifier in a query as being designated as optional. An optional quantifier will participate in a query depending upon certain conditions. If the columns (or objects) projected out in the view that are dependent upon the quantifier are not used by the query, the quantifier is dropped from the definition of the view. The query is processed using only the relations in the view not associated with the optional quantifier. The results returned are as if a left outer join operation with duplicate elimination had been performed, although the actual processing of the query was independent of, i.e., did not involve, a left outer join operation. If the columns (or objects) projected out in the view that are dependent upon the quantifier are used by the query, the optional quantifier remains in the definition of the view and the query is processed using a join operation.

21 Claims, 2 Drawing Sheets

OTHER PUBLICATIONS

"Query Processing in the ObjectStore Database System," Orenstein, Jack; Haradhvala, Sam; Margulies, Benson; Sakahara, Don; *Proc. ACM–SIGMOD International Conference on Management of Data*, San Diego, Jun. 1992.

"CQL++: A SQL for a C++ Based Object–Oriented DBMS," Dar, S.; Gehani, N.; Jagadish, H.; *Proc. International Conference on Extending Data Base Technology*, Advances in Database Technology—EDBT '92, Lecture Notes in Computer Science, Vienna, 1992, Springer–Verlag.

"Querying Object–Oriented Databases," Kifer, Michael; Kim, Won; Sagiv, Yehoshua; *Proc. ACM–SIGMOD International Conference on Management of Data*, San Diego, Jun. 1992.

"Object Query Language," Atwood, Tom; Duhl, Joshua, Ferran, Guy; Loomis, Mary; Wade, Drew; *Object Database Standards: ODMG—93 Release 1.1*, R.G.G. Cattell, editor, Morgan–Kaufmann Publishers, Inc., 1993.

"Experiences building the open oodb query optimizer," Blakeley, Jose; McKenna, William J.; Graefe, Goetz, *Proc. ACM SIGMOD International Conference on Management of Data*, Washington, D.C., May 1993.

"Observations on the ODMG–93 Proposal," Kim, W., *ACM SIGMOD Record*, 23(1), Mar. 1994.

"Queries and Views in an Object–Oriented Data Model," Dayal, U.; *Proc. 2nd International Workshop on Database Programming Languages*, Hull, Richard; Morrison, Ron; Stemple, David, editors; Gleneden beach, Jun. 1989, Morgan–Kaufmann Publishers, Inc.

"Object Views: Extending the Vision," Heiler, Sandra; Zdonik, Stanley; *Proc. 6th IEEE International Conference on Data Engineering*, pp. 86–93, Los Angeles, Apr. 1990.

"Objects and Views," Abiteboul, Serge; Bonner, Anthony; *Proc. ACM–SIGMOD International Conference on Management of Data*, pp. 238–247, Denver, Jun. 1991.

"Outerjoin Optimization in Multidatabase Systems," Chen, A., *Proc. 3nd International Symposium on Databases in Parallel and Distributed Systems*, Dublin, Jul. 1990.

"Simplification of Outer Joins," Bhargava, Gautam; Goel, Piyush; Iyer, Bala; *Research Report*, IBM Santa Teresa Lab 1995.

Microsoft. *Programmer's Reference, Microsoft Open Database Connectivity Software Development Kit*, 1992.

"Extensible/Rule Based Query Rewrite Optimization in Starburst," Pirahesh, H.; Hellerstein, J.; and Hasan, W.; *Proc. 1990, herein incorporated by reference, ACM SIGMOD Conf.*, Atlantic City, NJ, May 1990.

"An Efficient Hybrid Join Algorithm: Design, Prototype, Modelling and Measurement", Josephine, Cheng, Donald Haderle, Richard Hedges, Balakrishna R. Iyer, Theodore Messinger, C. Mohan, Yun Wang, Database Technology Institute, IBM # 90A003064, Feb. 15, 1990.

"An Efficient hybrid Join Algorithm: A DB2 Prototype", Josephine Cheng, Donald Haderle, Richard Hedges, Balakrishna R. Iyer, Theodore Messinger, C. Mohan, Yun Wang, Database Technology Institute, IBM # 91A000868, Dec. 17, 1990.

"The Outer Join", C. J. Date, IBM, Technical Report 03.181, Jan. 1982.

*Object Oriented Programming Using SOM and DSOM*, Christina Lau, Van Nostrand Reinhold, an International Thomson Publishing Company, 1994.

OPTIONAL QUANTIFIERS IN RELATIONAL AND OBJECT-ORIENTED VIEWS OF DATABASE SYSTEMS

CROSS REFERENCE TO RELATED APPLICATION

This application is related by common inventorship and subject matter to copending patent application No. ST9-95-045, entitled "OUTER QUANTIFIERS IN OBJECT-ORIENTED VIEWS AND QUERIES OF DATABASE SYSTEMS" filed on even date herewith, assigned to the Assignee hereof and entirely incorporated herein by this reference.

BACKGROUND OF THE INVENTION

1. Field of the Invention

The present invention relates to systems, methods, and computer programs in the field of database information retrieval, and, more specifically, for relational and object-oriented databases.

2. Description of the Related Art

Relational databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. A database will typically have many tables and each table will typically have multiple tuples and multiple columns. The tables are typically stored on random access storage devices (DASD) such as magnetic or optical disk drives for semi-permanent storage.

Data may be retrieved from this type of database by a variety of methods. For example, a computer program, i.e., an application, can extract information from the database without human intervention, or a user can interact with a query system program which serves as a front-end to the database system. "Accessing a table" is used in the art to mean reading information from a table. Since the tables are normally stored on DASD, accessing a table requires transferring all or part of the table from DASD into the RAM of the computer system. When results of an operation are output, the results are either displayed to a user or stored in some form of memory in the computer (RAM, DASD, TAPE, etc.) for subsequent use.

The DBMS is structured to accept commands to store, retrieve, and delete data. The term query is used to refer to a set of commands to retrieve data from the DBMS. One widely used and well known set of commands is called the Structured Query Language (SQL). The current SQL standard is known informally as SQL/92. The definitions for SQL provide that a DBMS should respond to a particular query with a particular set of data given a specified database content, but the method that the DBMS uses to actually find the required information in the tables on the disk drives is left up to the DBMS. Typically there will be more than one method that can be used by the DBMS to access the required data. The DBMS will optimize the method used to find the data requested in a query in order to minimize the computer time used and, therefore, the cost of doing the query.

A simple example of a query is:

```
SELECT COLUMNX
FROM TABLE1
WHERE COLUMNY = 'NEW YORK'
```

This query requests that the DBMS retrieve all COLUMNX fields from tuples in TABLE 1 which have COLUMNY equal to "New York". In practical applications, the query can become very complex. Multiple tables and multiple columns can be referenced. In order to distinguish which columns of which table is being referenced, COLUMNX of TABLE 1 may be written as TABLE 1.COLUMNX.

One of the most powerful features of SQL is the capability of nesting SQL query expressions within the predicate in the WHERE clause. Nested SQL queries are called subqueries. With subqueries, one can compare the column expression of a query to the column expression of another query. One can also compare column expressions with subqueries whose result is a table, either by testing set membership, testing if ANY row of the table expression has a property, or testing if ALL do. It is often quite natural to formulate a query using subquery in the predicate.

The terms "quantifier," "qualifier," and "range variable" are used in the same context and used synonymously, sometimes. In relational terms, they allow one to define an alias for a table. For example, in a table of employees, one can define two quantifiers, qualifiers, or range variables on that table. For example: In the FROM clause of a SQL query, one can specify:

from employee e1, employee e2

As such, e1 and e2 are quantifiers over the table of employees.

Views are SQL structures which provide a means for naming queries. Views are table expressions which specify tables, i.e., the table expressions have values that are derived from other tables. Views, whether relational views or object views, that span a large number of multi-valued relationships are difficult to handle in practice since the number of cross-products generated in the result is large. This may lead a view implementor to define a set of smaller views instead of a single view. Views can be used to make applications more independent from the names and format of the underlying objects (columns and tables). Authorization is associated with views so that views can be used as a protection mechanism to restrict access to a table. Views may also make use of joins and other SQL capabilities.

When information is needed from a plurality of tables, the tables may be joined by the database software or firmware. Joins allow additional information to be obtained across tables in a meaningful way. A join operation joins together two tables on the basis of common values in a common column. A simple example would be a table of employee information which lists an employee's department number as "76," but where the definition of department "76" requires reference to another table, the Department table, which lists the full department title associated with each department number. In this second table, the row for department "76" also contains a column with the department title "Information Systems Department." Thus, a user desiring to generate a report containing a list of all employees including their department titles may want to establish a join relationship between the department number column in the Employee-table and the department title column in the Department-table, so that the employee's department can be printed in the title form instead of the numerical form. The above describes a natural join which will be referenced herein as merely a join.

Conceptually, the SQL SELECT operation forms a cartesian product of the tables specified in the FROM clause and then selects the tuples that satisfy the predicates specified in the WHERE clause. As a result of this selection, some tuples of the input tables may not appear in the output; i.e., the operation loses some of the input tuples. A variant of the SQL SELECT operation called "outer join" does not lose any of the input tuples. (SEE ISO-ANSI Working Draft: Database Language SQL2 and SQL3, supra. See also, C. Date, Relational Database; Selected Writings, Addison-Wesley Publishing Co. 1986).

Several subcategories of the outer join operation have also been defined, called full outer join, left outer join, right outer join, and full natural outer join. Except for the full natural outer join, the rest are well defined only if two tables are specified in the FROM clause. The two tables are called left and right tables. If tuples of both tables (respectively, the left table or the right table) are preserved, the operation is called full (respectively, left, right) outer join.

Methods of performing a left outer join scan the outer table (at some stage) once and find the matching tuple of the inner table. At a given scan position, if no tuple of the inner table matches the outer tuple, the outer tuple is output with NULL values for the inner columns. Handling of the full outer join, which requires preserving the inner tuples also, is more involved. In the full outer join, preservation of the outer tuples can be done in the same way as the left outer join. The preservation of the inner tuples requires more work. The same is true for the right outer join. Note that although semantically a right outer join can be converted to a left outer join, this may not be desirable because it might be more expensive.

Ways of specifying and performing joins are the subject of substantial effort. Database tables can be very large and processing tables can be expensive in terms of computer resources.

In object-oriented databases (OODB), the database is organized into objects possibly having parent-child hierarchical relationships. The objects contain references, and collections of references, to other objects in the database, thus leading to databases with complex nested structures.

The integration of object technology and database systems has been an active area of research for the past decade. One important aspect of the integration of these two technologies is the provision of efficient, declarative query interfaces for accessing and manipulating object data. However, in the early days of OODB research, queries were given relatively little attention compared to other aspects of this technology. In "Object-Oriented Database Systems: Promise, Reality, and Future," Kim, Won, *Proc. 19th International Conference on Very Large Data Bases*, Dublin, August 1993, it is pointed out that even today, a number of commercial OODB systems are quite weak in this regard. As the OODB field has developed, however, a number of proposals for OODB query languages have appeared in the database literature including the following:

"A data Model and Query Language for EXODUS," *Proc. ACM-SIGMOD International Conference on Management of Data*, Carey, Mike; DeWitt, David; Vandenberg, Scott; Chicago, June 1988.

"A model of Queries for Object-Oriented Databases," Kim, Won. *Proc. 15th International Conference on Very Large Data Basses*, Amsterdam, August 1989.

"A query Language for the $O_2$ Object-Oriented Database System," Bancilhon, Francois; Cluet S.; Delobel, C.; *Proc. 2nd International Workshop on Database Programming Languages*, Hull, Richard; Morrison, Ron; Stemple, David, editors; Gleneden Beach, June 1989, Morgan-Kaufmann Publishers, Inc.

"Query Processing in the ObjectStore Database System," Orenstein, Jack; Haradhvala, Sam; Margulies, Benson; Sakahara, Don; *Proc. ACM-SIGMOD International Conference on Management of Data*, San Diego, June 1992.

"CQL++: A SQL for a C++ Based Object-Oriented DBMS," Dar, S.; Gehani, N.; Jagadish, H.; *Proc International Conference on Extending Data Base Technology*, Advances in Database Technology-EDBT '92. Lecture Notes in Computer Science, Vienna, 1992. Springer-Verlag.

"Querying Object-Oriented Databases," Kifer, Michael; Kim, Won; Sagiv, Yehoshua; *Proc. ACM-SIGMOD International Conference on Management of Data*, San Diego, June 1992.

"Object Query Language," Atwood, Tom; Duhl, Joshua; Ferran, Guy; Loomis, Mary; Wade, Drew; *Object Database Standards: ODMG-93 Release 1.1*, R. G. G. Cattell, editor, Morgan-Kaufmann Publishers, Inc., 1993.

"Experiences building the open oodb query optimizer," Blakeley, Jose; McKenna, William J.; Graefe, Goetz, *Proc. ACM SIGMOD International Conference on Management of Data*, Washington, D.C., May 1993.

While proposals outnumber actual implementations, several of these language designs have indeed been implemented as the query interfaces for significant commercial OODB products. See, "A query Language for the $O_2$ Object-Oriented Database System," Bancilhon, Francois; Cluet S.; Delobel, C.; *Proc. 2nd International Workshop on Database Programming Languages*, Hull, Richard; Morrison, Ron; Stemple, David, editors; Gleneden Beach, June 1989, Morgan-Kaufmann Publishers, Inc. See also, "Query Processing in the ObjectStore Database System," Orenstein, Jack; Haradhvala, Sam; Margulies, Benson; Sakahara, Don; *Proc. ACM-SIGMOD International Conference on Management of Data*, San Diego, June 1992.

The commercial OODB systems that are generally considered to have the best object query facilities are O2 (See, "A query Language for the $O_2$ Object-Oriented Database System," Bancilhon, Francois; Cluet S.; Delobel, C.; *Proc. 2nd International Workshop on Database Programming Languages*, Hull, Richard; Morrison, Ron; Stemple, David, editors; Gleneden Beach, June 1989, Morgan-Kaufmann Publishers, Inc.) and ObjectStore. (ObjectStore is a trademark of Object Design, Inc.)(See, "Query Processing in the ObjectStore Database System," Orenstein, Jack; Haradhvala, Sam; Margulies, Benson; Sakahara, Don; *Proc. ACM-SIGMOD International Conference on Management of Data*, San Diego, June 1992.) Each provide their own flavor of object query language. ObjectStore's query language is an extension to the expression syntax of C++. O2's query language is generally more SQL-like, and has been adapted into a proposed OODB query language standard (OODMG-93) by a consortium of OODB system vendors, but it differs from SQL in a number of respects. (See, "Object Query Language," Atwood, T.; Duhl, J.; Ferran, G.; Loomis, M.; and Wade, D.; *Object Database Standards:ODMG-93 Release* 1.1, Cattell, R. G. G., editor, Morgan-Kaufmann Publishers, Inc., 1993 and "Observations on the ODMG-93 Proposal," Kim, W., *ACM SIGMOD Record*, 23(1), March 1994.)

Furthermore, it should be noted that object/relational DBMSs support object oriented extensions of SQL, i.e., Illustra Relational Database System has object oriented features in it.

An object oriented database (OODB) view facility makes it possible for different users or user groups to have different perspectives on the same object data, as with relational views. However, in contrast with relational views, the view facility also supports the definition of views that includes reference and set-valued columns based on other views. This allows entire "view-schemas" to be created.

There have been various object view facility proposals that have appeared in the research literature as follows:

"Queries and Views in an Object-Oriented Data Model," Dayal, U.; Proc. 2nd International Workshop on Database Programming Languages, Hull, Richard; Morrison, Ron; Stemple, David, editors; Gleneden Beach, June 1989, Morgan-Kaufmann Publishers, Inc.

"Object Views: Extending the Vision," Heiler, Sandra; Zdonik, Stanley; Proc. 6th IEEE International Conference on Data Engineering, pages 86–93, Los Angeles, April 1990.

"Objects and Views," Abiteboul, Serge; Bonner, Anthony; Proc. ACM-SIGMOD International Conference on Management of Data, pages 238–247, Denver, June 1991.

"Querying Object-Oriented Databases," Kifer, Michael; Kim, Won; Sagiv, Yehoshua; Proc. ACM-SIGMOD International Conference on Management of Data, San Diego, June 1992.

In OODBMs, quantifiers can be defined over embedded collections as well as root collections. Root collections are analogous to the notion of tables in SQL queries. Collections can also be nested within other collections. For example, each department in the collection called "Dept" has a member called "emps" that is the collection of employees in a department. Quantifiers over root collections are bound to each instance of the collection. For example, if quantifier $q_2$ is bound to the nested collection $q_1 \cdot m_1$ where $m_1$ is a multi-valued member in $q_1$, then the set of elements to which $q_2$ is bound varies for each instantiation of $q_1$. Nested quantifiers are dependent upon other quantifiers, and create an ordering in the declaration of quantifiers in a SQL FROM clause. For example, if quantifier $q_2$ is dependent upon $q_1$, then the declaration of $q_1$ must precede that of $q_2$. Quantifier $q_2$ is dependent upon $q_1$ if $q_1$ has a member that is the nested collection over which $q_2$ is defined. A quantifier $q_k$ is transitively dependent upon a quantifier $q_i$ if there is a quantifier $q_j$ over which $q_k$ is dependent an $q_j$ is dependent over $q_i$.

Explicit quantifiers are declared in the SQL FROM clause. Parentheses are used to declare nested collection in queries. For example, the query fragment from Dept d, (d.emps) e declares the quantifier d over the root collection Dept, and declares the quantifier e over the embedded collection d.emps. As stated above, for each tuple to which d is bound, the set of tuples for bindings for e changes. Similarly to root collections, multiple quantifiers can be declared for embedded collections. The following query fragment declares two quantifiers over the embedded collection d.emps.:

from Dept d, (d.emps) e1, (d.emps) e2

The embedded collection over which a quantifier is defined can be part of a path of any depth, possibly containing multi-valued data members and methods. The only restriction is that the leaf node of the path has to be a multi-valued data member. In the following code fragment, the quantifier e2 is declared over the set of employees in e1's department:

from Emp e1, (e1.dept..emps) e2

Nested quantifiers can be defined also over other nested quantifiers.

Views having multiple quantifiers in their definition generate cross-products for each binding of each quantifier that satisfies the predicates in the view. Views with a large number of quantifiers are not practical if the query semantics "unnests" nested sets. These semantics are the default semantics for the query service described below. They are also the default semantics for relational DBMSs.

The problem which this invention overcomes is illustrated in reference to the Employee Department view defined as follows:

```
create view Emp_dept (dno, dname, eno, ename) as
(
    select d.no, d.name, e.no, e.name
    from Department d, Employee e
    where d.no = e.did
)
```

The above example describes a view. The view is built from two relations, employees and departments. The view produces results taken from a department table and an employee table. All of the information on departments and employees is given in this one implicit table, called the employee department (Empdept) view, which has four columns: department number (dno), department name (dname), employee number (eno), and employee name (ename).

To build this result, i.e., implicit table, a query from a join operation is used. The Empdept view has columns that are the result of a join between the Employee and Department relations. A join of department table and employee table on a foreign key of department id of an employee. The relationship creates a one to many relationship, and conversely a one to one relationship, i.e., a given department has many employees and a given employee has one department.

If information that pertains to employees and their departments is required, then the Empdept view is ideal. If, however, the Empdept view is used to extract information either for employees, or their departments, then this view has the following problems: 1)Selecting department columns results in the generation of duplicates since the number of tuples produced by the view is the number of employees across departments; and 2)Departments having no employees are excluded from the result. Similarly, employees with no departments are also excluded from the result.

For example, given such a view, if a user of the view only wants to select information about a department, there will be as many results as there are employees in departments. For example, if the sales department has 2 employees, the sales department will come out twice. If the marketing department has no employees, the marketing department will not come up in the result. One problem is of duplicates, the other problem is one of missing results. Basically, the problem arises due to certain operations on a table, relational semantics, and the way in which views are used.

One way to solve the first problem is to eliminate the duplicates using a SELECT DISTINCT operation in an SQL statement in the Empdept view. For example, SELECT DISTINCT dno, dname FROM empdept. The second problem, the missing values, can be solved using a left outer join in the body of the query. A left outer join will give a user the departments whether or not they have employees.

Also, the above problem can be solved by using full outer join semantics instead of join semantics (i.e., the predicate d.no=e.did is replaced with d.no*=*e.did).

The first solution, using SELECT DISTINCT, is expensive since duplicate elimination is usually performed using sorting. The second solution, using a left outer join, also has its limitations. An outer join is a very expensive operation in terms of computational costs. Also, an outer join is very complex and difficult to implement. Consequently, many commercial DBMS's such as DB2, do not support outer join operators. This second solution is therefore not even an option for many DBMS's.

In "Outerjoin Optimization in Multidatabase Systems," Chen, A., *Proc. 2nd International Symposium on Databases in Parallel and Distributed Systems*, Dublin, July 1990; and "Simplification of Outer Joins," Bhargava, Gautam; Goel, Piyush; Iyer, Bala; *Research Report*, IBM Santa Teresa Lab 1995, the authors have demonstrated that in some cases, these types of queries can be simplified by eliminating both the DISTINCT and the outer join, while preserving the semantics of the query. Eliminating the outer join and SELECT DISTINCT results in similar semantics as the present invention.

However, there are certain limitations to this approach. This approach detects a special case and bypasses the DISTINCT and the outer join for that special case. The DISTINCT and outer join are bypassed only for that certain special case. If the special case does not exist, the DISTINCT and outer join must still be used. For example, the special case is dependent upon projecting out a key. Projecting out a key means that one of the results selected has to be a key of the relation requested, i.e., department number and employee number of the Empdept view discussed above would be a key whereas employee name or department name would not be a key. In other words, the column being joined has to be one of the results. The above reference states that if a query has SELECT DISTINCT with outer join and it is projecting out columns participating in one relation, i.e., projecting out a key, both the DISTINCT and the outer join can be dropped by the query rewrite function of the DBMS. If the query is not projecting out a key, DISTINCT and the outer join are not dropped. If a user is not projecting out a key, the optimization does not work, and the user must resort to computing the outer join.

It is not clear how this optimization will scale up for large views. Also, this approach presupposes that the system does support outer join. Therefore, this solution can only be used in DBMS's that support outer join operations. Again, the problem with this approach is that the outer join is very expensive in terms of computational costs and is very difficult to implement, and in fact, is not available on many commercial DBMS's because of its complexity and heavy resource utilization.

The above described problem is magnified with large views and in highly scalable systems.

SUMMARY OF THE INVENTION

It is an object of this invention to solve the problem of excessive duplicates or missing results in an object view mechanism having large views involving many hierarchical relationships where the cross product effect produces a large effect.

It is a further object of this invention to provide a system, method, and program for providing the capability to query subparts of large views without incurring missing results and excessive duplicates, and without performing, i.e. independently of, an outer join operation.

It is a further object of this invention to provide a system, method, and program that allows the behavior of the view to be dependent upon the elements selected from the view.

The invention presented herein is in the framework of an Object Query Service. The Object Query Service is based upon SQL queries and other technology for handling the requirements of object technology. This invention provides an enhanced feature of SQL-based query access to an OODB system. However, this invention is also relevant to relational query products.

The invention provides the capability to designate quantifiers, that appear in queries, as optional. A new key word, "optional" is added to the query language providing a new type of quantifier having a special behavior and semantics. This new type of quantifier is called an optional quantifier.

An optional quantifier will participate in a query depending upon certain conditions. The semantics are simple. If the columns projected out in the view that are dependent upon the quantifier are not used by the query, the quantifier is dropped from the definition of the view. The view can be reused, and depending on its usage, the semantics will change. The technique is carried out in a query rewrite component of a DBMS wherein an optimizer changes the original query.

During parsing by an SQL parser, there is an internal representation of the query called a query graph model which, for object-oriented database systems, has been extended to be an object query graph model. The query is converted internally to this model including the query, views, and quantifiers. The extra property added to the quantifier entity is the fact that it could be made optional. If in the syntax the quantifier is designated as optional, then, internally in the representation, the quantifier is flagged as optional. Parsing builds the internal representation (the query, all the views the query uses, etc . . . ), then query rewrite performs a number of transformations that will examine the quantifiers to determine if they are marked as optional.

The query rewrite engine looks to see what the usage of the view is and depending upon that whether there are optional quantifiers and removes them from the definition of the view before transforming the query over views into a query over collections. They are removed depending upon the usage of the view columns that are made by the query. Criteria for removing is whether the columns that belong to that quantifier that are projected out from the view are used by the query or not.

For example, in an Employee Department (emp.dept) view, if an object belonging to an employee is selected, the resulting cross product will include employees having departments and departments having employees. If the information selected from the view is related information, then the usual join semantics are used. If the information selected e.g. department, is not dependent upon anything else, i.e., the information is isolated, and the other objects that are dependent upon department have been declared as optional, then those objects are eliminated from the query, via query rewrite, and it is as though the view had been written with only departments. The semantics of the present invention is similar to, but not exact to, the combination of the SELECT DISTINCT and outer join operation.

The system, method, and program of this invention addresses the problem encountered with views of databases that span a large number of multi-valued relationships. A new type of quantifier called optional quantifier is useful for views involving a large number of tables (or collections in the case of an OODBMS). The semantics of an optional quantifier are valuable to an application, especially in a highly scaled up environment having very large views. For example, in a highly scaled up environment, a column may be derived from following a path of a number of (e.g., ten or more) relationships with other objects. There may be a number of columns (e.g., in the order of a hundred or so) in the view type plus multiple nodes along the path. The likelihood of getting any data back in any reasonable amount of time (if ever) is slim if all parts of the view type had to be involved in the view. For large complex view types, a result set may be null and no results ever returned if all columns (attributes) were selected. A large view would have multiple outer joins that would not be able to be handled efficiently by even the best DBMS, or even arrive at a reasonable result using outer joins and SELECT DISTINCT. There are too many interrelationships, and these interrelationships are much more complex than a two way relationship.

This invention allows an application/user to be able to query on part of the result set, and to do it without incurring duplicates and missing results. By only being able to select certain attributes, columns, of a view type, then the other parts of the model do not enter into the query. With this invention, there is a dynamic view type. If a user/application is only interested in a subset of the columns of the views, the rest of the view type is ignored and not looked at. Parts of the view types are eliminated if those view types are not involved in getting to certain attributes.

Alternatively, instead of writing one view, a plurality of views representing a portion or all of the possible combinations of related information can be written. Then, the view is selected dependent upon what result was wanted. However, this alternative approach is not practical for views that have large number of relationships. Also, typically, a user is not able to create his/her own views. It is not practical to create a plurality of different view types for users to use in this way. Instead, this invention has a single view type that allows the columns to be selectable and allows the semantics of the query to change.

The optional quantifiers of this invention make it possible to define a view in which the behavior of the optional quantifier depends upon the query using the view. An optional quantifier will participate in a query depending upon certain conditions. An optional quantifier (and a possible cross product), is included in the view if at least one of it's members is referenced in the user's query. Optional quantifiers provide a different semantic in that if elements of both relations are referenced, join semantics, instead of outer join semantics are used.

Optional quantifiers have a semantics that can be achieved also using outer join and duplicate elimination if, for example, data items from one table (or collection) are selected from the view that is defined using outer join. However, the semantics of optional quantifiers is not that of outer join if data items from more than one table (or collection) are extracted. If related data items (the relationship is established using joins or with OO navigational queries) are extracted from a view containing optional quantifiers, join semantics are used and only related elements are returned. In contrast, outer join semantics would return both related and unrelated data items. Duplicate elimination is costly in performance, whereas optional quantifiers can be handled by a query rewrite optimizer by applying transformation over the query graph. The query graph represents the user's query and the views that it references. The transformations over the query graph remove optional quantifiers from the query graph if no columns qualified by an optional quantifier are referenced in the user's query. Optional quantifiers defined in the scope of nested quantifiers in an Object-Oriented framework introduce additional semantics due to dependencies. These semantics are used to produce meaningful results for the user, and could not easily be simulated using outer joins.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
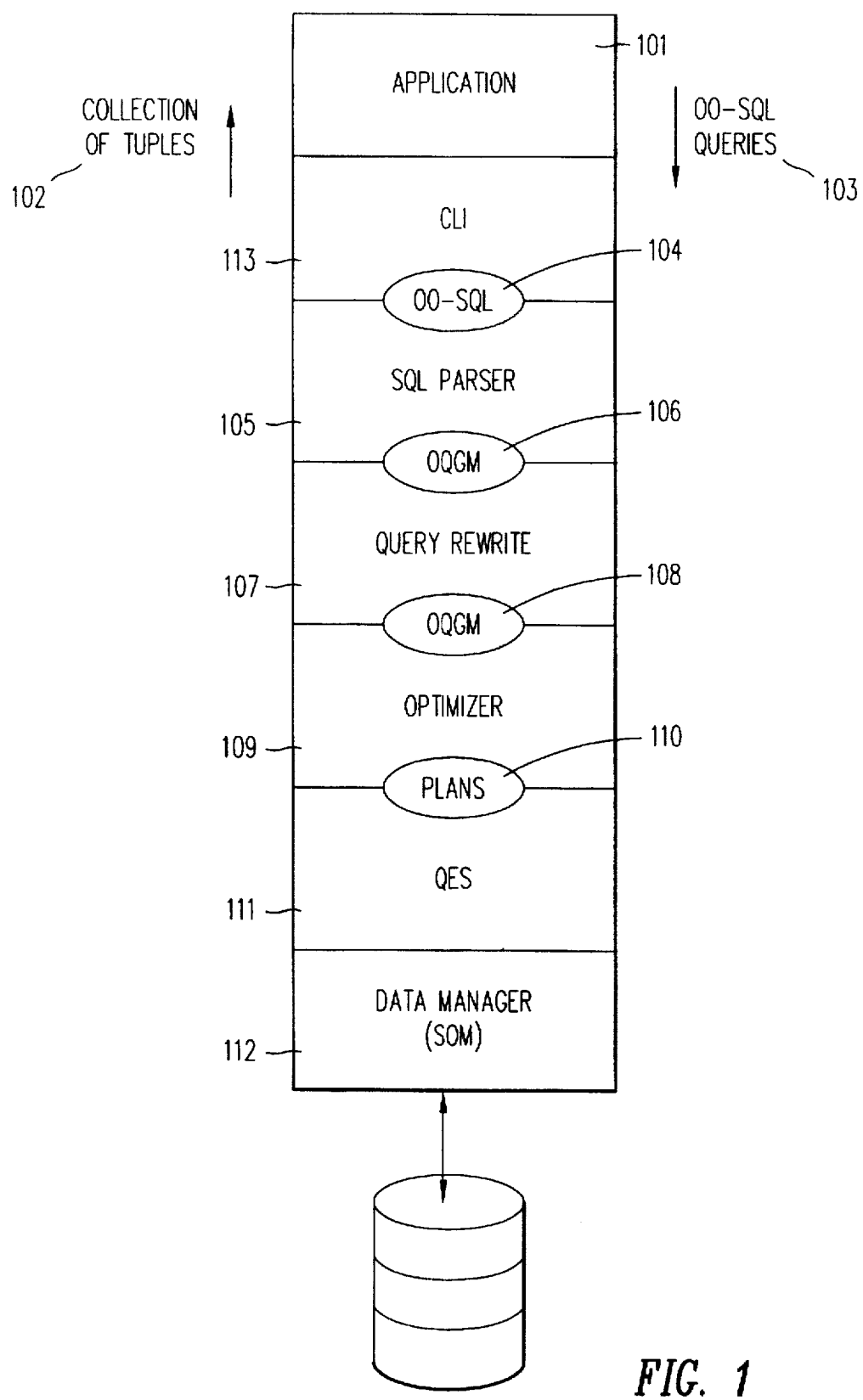
FIG. 1 is a functional block diagram of the system of the invention for processing a query having optional quantifiers.

The present invention is a new feature of OO-SQL. OO-SQL is an Object-Oriented Query Service for Object-Oriented Databases (OODB) and Object-Oriented Systems (OOS). In contrast to O2, ObjectStore, and ODMG-93, OO-SQL is an OODB query interface that provides an upward compatible extension to SQL/92. This enables programmers familiar with SQL to write OODB queries without learning an entirely new language. They merely learn about the object extensions. OO-SQL is an effective query language for interactive use from an interface in addition to being an effective embedded object query language for programs such as C++ programs. OO-SQL also enables the many tools that have been built for relational systems to access OODB data via interfaces such as ODBC (Microsoft. *Programmer's Reference, Microsoft Open Database Connectivity Software Development Kit, 1992.*)

An OO-SQL query engine allows extended SQL queries to be automatically generated and issued from a query browser interface called OO-SQL/QB, embedded in application programs or issued interactively from an interface. The query language supported by the engine is the complete SQL/92 select statement plus object extensions for navigating along paths and embedded structures, querying nested sets, and invoking member functions. OO-SQL includes an OODB view facility for defining views of OODBs and OOSs. An object-oriented SQL view facility allows one to define object-oriented views, and to define views that flatten complex OODB schemas, allowing direct access by existing tools designed to provide remote access to relational databases. These relational tools provide relational access to object-oriented (OO) data residing in OODBs and OOSs. The view facility also supports the definition of views that include reference and set-valued columns based on other views, thus allowing entire object-oriented view schemas to be created. OO-SQL provides the notion of view type that can be defined and then used to create views of multiple collections.

OO-SQL provides path expressions for the purpose of writing queries involving a navigational component. Path expression in OO-SQL permit traversal through embedded classes (and structures), pointers (and relationships), and collections. Traversal of embedded structures and references is supported via the operator ".." (instead of "."). An OO-SQL path expression can appear anywhere that a column can appear in SQL/92.

OO-SQL supports access to the elements both of top-level collection and nested collections. In addition, nested collections can appear in OO-SQL queries anywhere that SQL/92 permits the appearance of a subquery (i.e., a nested query).

In SQL/92, quantifiers range over top-level collection (i.e., relations) and are declared in the FROM clause. OO-SQL adds parentheses for declaring quantifiers over nested collections. For example, the following query selects the department name and employee numbers of the employees in department 1, yielding as many result tuples as there are employees in department 1:

```
select d.name, e.no
from Dept d, (d.emps) e where d.no = 1;
```

This query declares a quantifier "d" to range over the root collection "Dept" and a quantifier "e" that ranges over the elements of the embedded collection "d.emps". During query evaluation, for each different object to which "d" is bound, the set of bindings for "e" changes.

OO-SQL includes features for dealing with inheritance (e.g., querying collections where the elements can be of a type or any of its subtypes) and with C++ methods. Inherited members can be specified in OO-SQL either implicitly, by merely giving the column name of the inherited member, or explicitly, by prefixing such members with the class name where they are defined (followed by the character pair "::"). Methods can appear anywhere a data member can appear, including path expressions.

The OODB view facility is based upon OO-SQL queries and on the use of relational-style query rewrite techniques. For examples see, "Extensible/Rule Based Query Rewrite Optimization in Starburst," Pirahesh, H.; Hellerstein, J.; and Hasan, W.; *Proc. 1990, ACM SIGMOD Conf.*, Atlantic City, N.J., May 1990. The OODB view facility makes it possible for different users or user groups to have different perspectives on the same object data as with relational views. Also, having an OODB view facility makes it possible to make OODB data, which is usually stored as complex nested structures, appear as relational tables for access by legacy relational tools and applications.

An OO-SQL query processing system is described as follows. A preferred embodiment has an implementation of OO-SQL that runs on top of SOM. SOM, which indicates System Object Model, is well known in the art as an object architecture. It is described fully in "Object Oriented Programming Using SOM and DSOM", Lau, Christina; *Van Nostrand Reinhold, an International Thomson Publishing Company*, 1994. In addition, OO-SQL can run on top of an Object-Store OODB system. FIG. 1 presents the framework for the implementation, which supports the integration of the OO-SQL engine with users' applications. The application 101 issues SQL queries 103 through a Call Level Interface (CLI). The SQL parser component 105 converts the query into an internal representation, i.e. a data structure OQGM (object query graph model) 106, 108 which is passed to the query rewrite component 107, and the query optimization component 109. Each query is then translated into an executable plan 110. Once translated, a query plan (QPL) 110 is passed to the Query Evaluation Subsystem, (QES) 111, which runs it against SOM collections of objects and returns an ordered collection of tuples 102 to the application. Query results can include pointers to objects in stored collections. These pointers are simply virtual memory addresses in an application program, so they must be valid pointers in the application program's workspace in order to be useable for further C++ based navigation and data manipulation.

The present invention was developed in the context of an Object Query Service, and is an enhanced feature of a SQL-based query access to an OODB system. However, the invention could also be incorporated into SQL queries for relational systems. Since relational technology is more widely understood, the invention can be best described using notions borrowed exclusively from relational database technology using relational views instead of object views. For definitional purposes herein, the term "element" may refer to a column of a relational system or an object of an object-oriented system.

More specifically, this new enhanced feature of SQL queries provides the ability to annotate quantifiers that appear in queries as being optional. The semantics provide that if the projected columns of the view that are dependent upon the quantifier are not used, the quantifier marked as optional is dropped by the query optimizer (i.e., query rewrite). The view can be reused, and depending on its usage, the semantics will change.

The invention will be described with reference to FIG. 1 and to FIG. 2. An application 101 submits SQL queries 103. Returned to the application 101 (which could also be a user interacting through an interface), after the end of the following process, is a collection of tuples. The SQL parser 105 parses the query that comes in and generates an internal representation of the query called a query graph, step 201. The internal representation, in the form of data structures, is called an object query graph model (OQGM) 106. Any views that the query is referencing are brought in into the OQGM 106, and connected into the query. Any views that those views are using are also brought in into the OQGM 106 and connected similarly. That is, all the views that are referenced by the query, and transitively, other views that are referenced by these views are added to the query graph, step 202. Each quantifier entity is represented internally, and the internal representation, OQGM, will indicate whether the quantifiers are dependent upon each other. (For example, where "toys" are dependent upon "children", "children" are dependent upon "employees" and "employees" are dependent upon "department.") In addition, the internal representation will indicate if a quantifier is marked as optional.

To process queries over views, standard relational query rewrite techniques are used that were developed for relational systems. (See, "Extensible/Rule Based Query Rewrite Optimization in Starburst," Pirahesh, H.; Hellerstein, J.; and Hasan, W.; *Proc. 1990 ACM SIGMOD Conf.*, Atlantic City, N.J., May 1990.) Added to these techniques by this invention is the handling of optional quantifiers and the determination as to whether the optional quantifier will be kept or not, and the determination as to whether or not the optional quantifier will affect the semantics of the query.

As such, the OQGM 106 is passed to the query rewrite component 107 or rewrite phase. The query rewrite engine 107, makes a determination as to whether a quantifier is marked as optional. Then, the query rewrite phase will examine the usage of each of the quantifiers. If the optional quantifier is used anywhere in any of the dependencies, the whole view, up to the point where the optional quantifier is used, remains.

Figure 2:
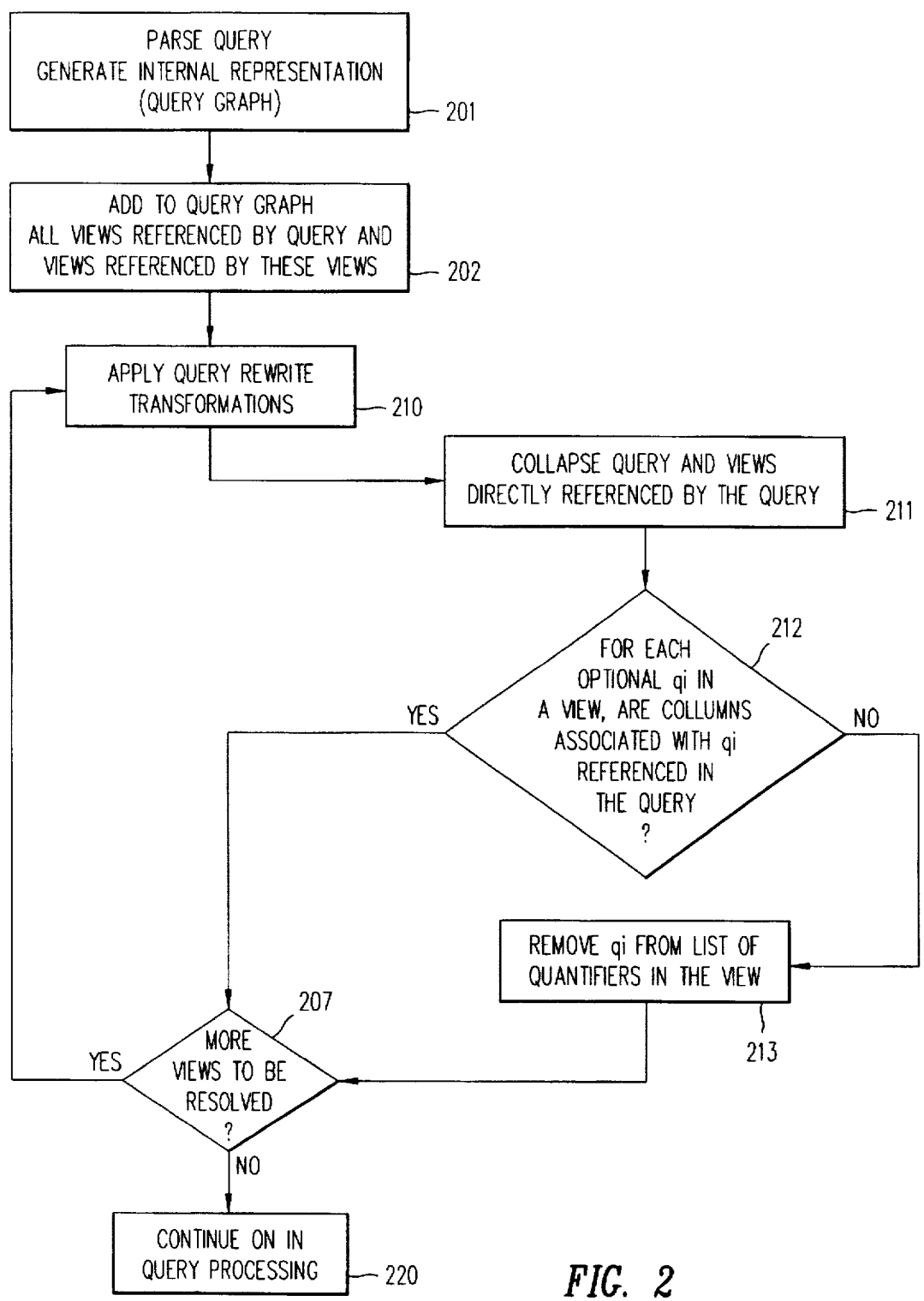
FIG. 2 is a functional block diagram of a flow chart illustrating the method for processing a query having optional quantifiers.

Again, with reference to FIG. 1 and FIG. 2, query rewrite 107 applies transformations, step 210, to collapse the query and the views directly referenced by the query, step 211. This includes a number of optimizations including view elimination, i.e., select elimination to try to merge the whole OQGM to one query. In the query rewrite phase, step 210, also applied are transformations for optional quantifiers. For each optional quantifier $q_i$ in a view, if none of the columns associated with $q_i$ are referenced in the query, step 212, the optional quantifier $q_i$ is removed from the list of quantifiers in the view, step 213. If there are remaining views to be resolved, the process returns to query rewrite to apply the rewrite transformations, step 210. After the rewrite phase, steps 210–213, the result is a query graph that represents a merge of the query and views through a single query that is then picked up by the optimization phase 109. The optimizer 109 no longer knows anything about whether or not there were optional quantifiers. The phases after query rewrite 107, such as plan optimization and query runtime, are oblivious to the fact that a quantifier may have been declared as optional. These phases and components after query rewrite carry out their functions independently of, i.e., without knowledge of, any designated optional quantifier.

The invention presented offers similar functionality to views with left outer joins and duplicate elimination. However, there are slight differences in the semantics of optional quantifiers, with respect to outer joins. These differences will be illustrated below. The advantage of optional quantifiers over duplicate elimination with left outer join is performance.

The invention can be illustrated with the following example.

```
create view Emp_dept (dno, dname, eno, ename) as
(
    select d.no, d.name, e.no, e.name
    from Department d, Employee e
    where d.no = e.did
)
```

Suppose that Employee e is redeclared as optional Employee e, as shown below in the Employee Department view with optional quantifier e.

```
create view Emp_dept (dno, dname, eno, ename) as
(
    select d.no, d.name, e.no, e.name
    from Department d, optional Employee e
    where d.no = e.did
)
```

If a query over Empdept selects only column(s) dno and/or dname, the quantifier Employee e is dropped from the definition of the view before the query is evaluated. Note that the predicates that involve e are also dropped. Hence, d.no=e.did is also removed from the definition of the view. The query will then retrieve only departments from the view, and the number of tuples retrieved is equal to the number of departments, and not the number of employees across departments. If there are no duplicates in the Department relations, then the semantics are equivalent to at least left outer join with duplicate elimination, e.g., a SELECT DISTINCT. If either eno or ename is referenced in the user's query, then employees and their departments are retrieved from the view. Note that here, join semantics are used instead of outer join semantics. Furthermore, if neither dno or dname are referenced in the view, still, only employees having departments are retrieved. This is due to the fact that the Department quantifier is not optional. Employees with no departments can also be retrieved from this view by declaring the Department quantifier d as optional. Nevertheless, join semantics would still be used if the user's query references columns from both relations.

Consider again a query over Empdept shown above which selects only column dname. "d.name" is not the key. The query and view are transformed internally into a single query. The usage of the optional quantifier is examined to determine if it is being used in this query, and the answer is no, so it is being dropped from the definition of the rewritten query before a plan is generated for it. The plan generated will just consider iterators for department. The query is just over the department. Ignored are the optional employee and WHERE statement because it involves something from employee, i.e., "e.did".

The query rewrite engine looks to see what the usage of the view is and depending upon that whether there are optional quantifiers and removes them from the definition of the view before transforming the query into a single query. They are removed depending upon the usage of the view columns that are made by the query. Criteria for removing is whether the columns that belong to that quantifier that are projected out from the view are used by the query or not.

Similar to quantifiers over root collections, quantifiers over nested collections can be declared as optional. Nested quantifiers are implicitly optional if they are dependent upon an optional quantifier. In the Empdeptchild view shown below:

```
create view Emp_dept_child (dno, dname, eno, ename, cname) as
(
    select d.no, d.name, e.no, e.name, c.name
    from Department d, optional (d.emps) e, (e.children) c
)
```

This view produces the names of children of employees in departments, along with employee numbers and names, and departments numbers and names. Quantifier c is dependent upon quantifier e which is dependent upon quantifier d. Since quantifier e is optional, all quantifiers dependent upon it are optional. Therefore, quantifier c is also optional even if it is not declared as such. Another aspect of these dependencies is that if an element of an optional quantifier is referenced in a query, then all quantifiers over which it depends are included in the query, whether or not they are optional and do not have an element referenced in the user's query. For example, the query "select cname from Emp deptchild" would cause the quantifier e to remain in the view even if none of it's elements are referenced in the query. The query returns all the children names across employees across departments.

Likewise, in context of an object oriented framework having hierarchical structures, one of the particularities of object oriented databases is nested sets. For example, the department has a set of employees, employees can have a set of children, and children can have a set of toys. The employees would be selected from a nested quantifier over the department. The relationship that exists between department and employee and employee and child, is determined through the hierarchical structure. If any quantifier along that path is declared as optional, the quantifiers that are dependent upon that are also optional. A feature of optional quantifiers and their semantics is that a user does not have to repeat "optional" all the way through the nested sets. "Optional" only has to be declared at the root. For example, by defining quantifier d on departments, quantifier e on employees in that department d, defining quantifier c on the children of that employee e, and by designating that e is optional, the optional is inherited to the children of e. If select from department, employees and children will go away, if select from employee, children will go away, if select from children, it will all stay. This feature scales well with large views. Outer joins would not scale similarly, and would become more complicated.

Using the foregoing specification, the invention may be implemented using standard programming and/or engineering techniques. The resulting program(s), having computer readable program code means, may be stored on a computer usable memory such as disk, diskettes, memory cards, ROM, tape, or any other memory device or embodied as electrical signals and transmitted over a communication link. For execution, the program may be copied into the RAM of the computer. User input may be received from the keyboard, mouse, pen, voice, touch screen or any other means by which a human can input data to a computer, including through other programs such as application programs. One skilled in the art of computer science will easily be able to combine the software created as described with appropriate general purpose or special purpose computer hardware to create a computer system embodying the invention and to create a computer system for carrying out the method of the invention. While the preferred embodiment of the present invention has been illustrated in detail, it should be apparent that modifications and adaptations to that embodiment may occur to one skilled in the art without departing from the scope of the present invention as set forth in the following claims. This includes, but is not limited to, applying the invention to other types of databases including object-oriented databases, and relational databases, etc . . . . More specifically, the term "element" can refer to both relational or object-oriented database systems, e.g. meaning a column or an object, respectively. Likewise, other relational terms used, e.g., tuple, could also mean a similar entity in object-oriented database technology. Reference to a user may mean, interchangeably, a human interacting through an interface to the system, or an application program running on the system and interacting with the system. Also, the invention could be implemented in a computer system where the application and/or user, the storage device(s) containing the database, and the database management systems are all or partly remote from each other and connected via a communication link.

We claim:

1. A method, in a database management system, for processing a query, said method comprising:

receiving said query over a view having a first relation and a second relation, said view having a quantifier designated as optional wherein said quantifier refers to said second relation, said query selecting elements only from said first relation;

processing the query independently of a left outer join operation; and returning a result set having a number of tuples dependent upon the number of elements in said first relation;

whereby a semantic of the query is equivalent to a left outer join with duplicate elimination if said first relation contains no duplicates.

2. The method of claim 1 further comprising:

receiving a second query over the view having the first relation and the second relation, said view having the quantifier designated as optional wherein said quantifier refers to said second relation, said second query selecting elements from said first relation and said second relation; and returning a result set from said first relation and said second relation using a join semantic.

3. A method, in a database management system, for processing a query, said method comprising:

determining a usage, by said query, of a view having at least a first relation and a second relation by determining whether at least one element is referenced, by said query, from each one of said at least said first relation and said second relation making up the view;

determining which one relation of said at least one of said first relation and said second relation is not referenced by the query and determining if there is an optional quantifier associated with said one relation not referenced;

removing, from a definition of the view for said query, each of said one relation having said optional quantifier, thereby making a second definition of said view; and processing said query using said second definition of the view.

4. A method, in a database management system, for processing a query, said method comprising:

determining a usage, by said query, of a view having at least a first relation and a second relation;

determining if there is an optional quantifier associated with elements from any of said first relation and said second relation; and removing, from a definition of the view for said query, said optional quantifier if elements, belonging to the optional quantifier, that are projected out from the view are unused by the query, thereby making a second definition of the view; and processing said query using said second definition of the view.

5. A method, for use in a database management system, for processing a query, said method comprising:

parsing said query;

generating an internal representation of said query including a) each view that the query is referencing and any additional view said view is using, b) each quantifier, and c) an indication if said each quantifier has been designated as optional;

determining whether or not to keep any one of said each quantifier designated as optional;

determining whether said quantifier designated as optional will affect a semantic of the query;

rewriting said query dependent upon said determinations; and processing said query based upon said query as rewritten.

6. The method of claim 5, further comprising a step of optimizing a rewritten query independently of the optional designation of the quantifier.

7. The method of claim 5, wherein the step of determining whether or not to keep said any one of said at least one quantifier is dependent upon determining a usage of the quantifier in the query.

8. The method of claim 5 wherein if the optional quantifier is used in any of at least one dependency, a whole view, up to a point where the optional quantifier is used, is used in processing said query.

9. The method of claim 5 wherein if the query makes references independently of any column associated with the optional quantifier, said optional quantifier is removed from a list of quantifiers in the view.

10. A database system comprising:

means for providing a capability for a user to query, via a query, at least one subpart of a view;

means for providing a capability for said user to designate another part of the view as optional;

means enabling a behavior of a view to be dependent upon an element selected from the view by the query; and means for changing a semantic of the view depending upon a different use of the view by the query.

11. A database system comprising:
means for providing a capability for a user to query, via a query, at least one subpart of a view;
means, in response to the query involving only said subpart of the view, for eliminating a remaining part of the view from an optimized query if said remaining part of the view is not involved in accessing certain ones of at least one attribute from the query and said remaining part had been designated as optional.

12. A database system comprising:
means for recognizing a quantifier designated, in a view, as optional in a query to said database system; and
means for eliminating the quantifier from participation in the view if each one of at least one element, dependent upon the quantifier and projected out in the view used by the view, are unused by the query.

13. The database system of 12 wherein said means for eliminating the quantifier from participation in said query comprises dropping the quantifier from the definition of the view.

14. A database system comprising:
means for providing a single view type of a plurality of relations;
means for providing a capability for at least one quantifier associated with at least one of said plurality of relations to be designated as optional;
means for allowing at least one of a plurality of columns to be selected in a query; and
providing a capability to change a semantic of the query depending upon which columns are selected and which quantifier is designated as optional.

15. A database system comprising:
means for recognizing a quantifier, appearing in a view definition, annotated as being optional;
means for dropping the quantifier marked as optional, by a query rewrite engine, if each of at least one projected column, dependent upon the quantifier, of the view is unused by a query;
means for reusing the view for a second query; and
means for changing a semantic of the second query depending upon a usage of the view.

16. A computer system having a database management system, at least one random access storage device for storing relations of information, a communication link for receiving and sending data to at least one remote client computer system having access to said relations of information, said computer system comprising:
means for parsing a query received from a user;
means for generating an internal representation of said query including a) each one of at least one view that the query is referencing and any additional at least one view said each one of at least one view is using, b) each one of at least one quantifier, and c) an indication if said each one of at least one quantifier has been designated as optional; and
means for determining whether or not to keep any one of said at least one quantifier designated as optional;
means for determining whether said quantifier designated as optional will affect a semantic of the query;
means for rewriting said query dependent upon said determinations;
means for optimizing a rewritten query independently of an optional designation of any of said at least one quantifier; and means for processing said query based upon said rewritten query optimized.

17. An article of manufacture comprising:
a computer usable medium having computer readable program code means embodied therein for processing a query, the computer readable program code means in said article of manufacture comprising:
computer readable program code means for providing a database management system a capability to receive said query over a view having a first relation and a second relation, said view having a quantifier designated as optional wherein said quantifier refers to said second relation, said query selecting elements only from said first relation;
computer readable program code means for providing a capability to process the query independently of a left outer join operation; and
computer readable program code means for providing a capability to return a result set having a number of tuples dependent upon the number of elements in said first relation;
whereby a semantic of the query is equivalent to a left outer join with duplicate elimination if said first relation contains no duplicates.

18. The article of manufacture of claim 17 further comprising:
computer readable program code means for providing a capability to receive a second query over the view having the first relation and the second relation, said view having the quantifier designated as optional wherein said quantifier refers to said second relation, said second query selecting elements from said first relation and said second relation; and
computer readable program code means for providing a capability to return a result set from said first relation and said second relation using a join semantic.

19. An article of manufacture comprising:
a computer usable medium having computer readable program code means embodied therein, the computer readable program code means in said article of manufacture comprising:
computer readable program code means for providing a database management system a capability to determine a usage, by said query, of a view having at least a first relation and a second relation by determining whether at least one element is referenced, by said query, from each one of said at least said first relation and said second relation making up the view;
computer readable program code means for providing a capability to determine which one relation of said at least one of said first relation and said second relation is not referenced by the query and determining if there is an optional quantifier associated with said one relation not referenced; and
computer readable program code means for providing a capability to remove, from a definition of the view for said query, each of said one relation having said optional quantifier, thereby making a second definition of said view.

20. An article of manufacture comprising:
a computer usable medium having computer readable program code means embodied therein for processing a query, the computer readable program code means in said article of manufacture comprising:
computer readable program code means for providing a database management system a capability to determine a usage, by said query, of a view having at least a first relation and a second relation;

computer readable program code means for providing a capability to determine if there is an optional quantifier associated with elements from any of said at least said first relation and said second relation;

computer readable program code means for providing a capability to remove, from a definition of the view for said query, said optional quantifier if elements, belonging to the optional quantifier, that are projected out from the view are unused by the query, thereby making a second definition of the view; and computer readable program code means for providing a capability to process said query using said second definition of the view.

21. An article of manufacture comprising:

a computer usable medium having computer readable program code means embodied therein for processing a query, the computer readable program code means in said article of manufacture comprising:

computer readable program code means for providing a database management system a capability to recognize a quantifier designated, in a view, as optional in a query to a database system; and computer readable program code means for providing a capability to eliminate the quantifier from participation in said query if each one of at least one element, dependent upon the quantifier and projected out in the view used by said query, are unused by the query.

* * * * *